2,934,428

METHOD FOR TREATING NICKEL SULPHIDE ORE CONCENTRATES

John William Donaldson and Howard Franklin Davis, Jr., both of Ottawa, Ontario, Canada, assignors to Quebec Metallurgical Industries Ltd., Ottawa, Ontario, Canada, a company of Canada No Drawing. Application May 8, 1957
Serial No. 657,734

1 Claim. (Cl. 75—101)

This invention relates to treatment of nickel sulphide ore concentrates which, in addition to nickel, contain cobalt, copper and iron and usually substantial amounts of precious metals together with gangue materials. The method of the invention involves formation of a nickel-copper matte and the selective extraction of substantially all the nickel therefrom with aqueous sulphuric acid to leave a residue containing substantially all the copper and precious metal contents of the concentrate. The residue may be treated to obtain a solution containing substantially all its copper content and a second residue containing substantially all the precious metal content of the concentrate.

Many attempts to extract nickel from a copper-nickel matte by leaching with sulphuric acid have been made prior to the present invention. Thus, in an effort to solve this problem, the early United States Patent No. 791,090 proposed mixing sulphur with the finely divided matte before subjecting the matte to the action of sulphuric acid. United States Patent No. 939,947 proposed treating a matte largely diluted with ferrous sulphide to increase the solubility of the matte in sulphuric acid and to recover undissolved nickel from the nickeliferous slag of the subsequent bessemerizing operation.

United States Patent No. 1,729,423 states that treatment of a copper-nickel matte by leaching with sulphuric acid removes about twenty to thirty percent of the nickel. This patentee proposed subjecting the residue to a series of treatments each involving roasting at a temperature of 300° C. to 500° C. followed by leaching with sulphuric acid to obtain a more complete removal of the nickel as well as the copper.

United States Patent No. 1,756,092 states that there are many patents disclosing processes based upon the principle known in analytical chemistry that sulphide of nickel is soluble in acids while those of copper, silver, gold and all the metals of the platinum group are insoluble but such processes had not attained the desired commercial success owing to the fact that the nickel in ordinary converter matte dissolves slowly and incompletely. As a solution of this problem, this patentee proposed rapidly cooling the matte and retaining in the matte an appreciable amount of iron sulphide (2 to 10 percent iron sulphide). The resulting matte was leached with sulphuric acid and the residue of insoluble sulphides blown to metal in a converter. The impure copper thus produced was refined electrolytically and the residue from the anodes contained the precious metals.

The somewhat later United States Patent No. 2,223,239 states that when a nickel-copper matte is treated with an acid either only part of the nickel passes into solution or large amounts of copper are also dissolved. This patent states that more nickel passes into solution in the acid and at a more rapid rate when using a matte the sulphur content of which amounts to about a quarter of the copper content. United States Patent No. 2,239,626 proposes subjecting a nickel-copper matte to a long lasting heat treatment at a temperature between 400° and 900° C. to increase its solubility in acid.

The prior art referred to above shows that the art has been searching for a satisfactory method for the recovery of nickel from a copper-nickel matte by treating the matte with sulphuric acid for many years. Surprisingly, the prior art does not suggest sulphuric acid leaching of a copper-nickel matte produced in an electric furnace.

In accordance with the present invention, a nickel sulphide ore or concentrate containing nickel, cobalt, copper and iron and usually precious metals together with some gangue materials, such as silica, alumina, and magnesia, is subjected to an oxidizing roast at a temperature between about 500° C. and 800° C. to reduce its sulphur content. The calcine then is smelted, preferably without added reducing agent, in an electric furnace heated by electric energy supplied through electrodes to form a matte and a slag, a suitable flux being mixed with the furnace charge when necessary. The sulphur content of the charge to the electric furnace should be at least equal to but not substantially greater than about the amount theoretically required to form sulphides with the nickel, cobalt, copper and precious metal contents of the charge. The sulphur content of the calcine may be substantially less than that desired in the charge to the electric furnace and may be mixed with a suitable amount of concentrate to form the electric furnace charge having a desired sulphur content.

The matte thus produced is crushed or ground to a finely divided form and treated with hot aqueous sulphuric acid to obtain an aqueous sulphate solution containing substantially all the nickel, cobalt and iron contents of the matte and a residue containing substantially all the copper together with the precious metals. It has been found that a matte produced as above described can be treated with aqueous sulphuric acid to obtain an aqueous sulphate solution containing 98 percent or more of the nickel content of the matte.

It has been found that in producing the matte the electric furnace may be operated in any conventional manner without affecting the leaching characteristics of the mattes produced although the grade of matte produced may vary slightly with different operating conditions. For example, the electrodes may be operated on dead short without either the electrodes or the arc touching the melt or the electrodes may be in the slag and slag resistance type of operation used or the electrodes may be out of the slag and an arc-slag resistance type of operation used.

For leaching, matte ground so that 80 percent is minus 65 mesh has provide satisfactory. Larger particle size matte may be used but usually increases the leaching period required. Leaching solutions containing from about 10 to 50 percent sulphuric acid by volume have proved satisfactory when used at temperatures between about 50° C. and 95° C. The pulp density depends upon the grade of the matte and the maximum nickel content of the leach liquor. Nickel strengths of 50 grams per liter have been achieved.

The surprising results obtained by the practice of the invention are illustrated by the following. A matte was produced by subjecting a nickel sulphide ore concentrate to an oxidizing roast to reduce its sulphur content to about 8 percent by weight. This calcine was mixed with a suitable flux to form a furnace charge containing no carbonaceous reducing agent. In a first test a portion of this charge was placed in a clay crucible and smelted under conditions similar to reverberatory furnace conditions. The resulting matte had poor leaching characteristics with only 20 percent of the nickel being recovered in the leaching solution. In a second test a matte produced in an electric furnace from another portion of the above furnace charge was leached in the same manner as in the first test and gave excellent leaching results with 98 percent of the nickel extracted from the matte and reporting in the leach liquor.

The aqueous sulphate solution obtained by leaching matte as previously described and containing the nickel, cobalt and iron contents of the matte may be concentrated by evaporation and in cooling the major portions of the nickel, cobalt and iron crystallize out as sulphates. The barren solution containing the unused acid and some nickel, cobalt and iron may be diluted and the acid content adjusted for reuse as a leaching solution.

The sulphate precipitate can be treated in two ways depending upon its iron content. If the ratio of nickel to iron is about 4 to 1 or more, the precipitate may be dissolved in water and then treated to recover the nickel and cobalt by known methods. If the ratio of nickel to iron is less, the precipitate can be roasted in an atmosphere of sulphur dioxide and oxygen to convert the iron sulphate to water insoluble ferric oxide, the sulphates of nickel and cobalt remaining unaffected. This calcine then may be leached with water to obtain a solution containing most of the nickel and cobalt, the residue consisting mainly of ferric oxide. The resulting solution, containing a ratio of nickel to iron of 4 to 1 or greater, may be treated for the recovery of nickel and cobalt in any conventional manner.

The copper-containing residue resulting from leaching the matte with aqueous sulphuric acid may be melted and then blown in a copper converter to blister copper. The small amount of nickel-bearing slag produced in this operation may be returned to the matte smelting furnace. However, there is considerable loss of precious metals in the slag formed in the converter operation and the remaining precious metals must be separated from the copper.

The present invention contemplates a method for treating the copper-containing residue resulting from leaching the matte with aqueous sulphuric acid whereby substantially all the copper is separated in the form of an aqueous solution without loss of precious metals and substantially all of the latter remain as a residue from which they may be recovered in a conventional manner.

Thus, in accordance with the present invention the copper-containing residue resulting from leaching the matte is subjected to an oxidizing roast at a temperature between about 500° C. and 800° C. to remove substantially all the sulphur. The resulting calcine is leached with aqueous sulphuric acid, preferably at a temperature between about 50° C. and 95° C. with aqueous sulphuric acid containing from about 2 to 15 percent sulphuric acid by volume, to obtain a solution containing 98 percent or more of the copper in the material leached and a residue containing substantially all the precious metals. A small amount of sponge copper may be added to the solution to precipitate any dissolved silver.

The invention is illustrated further by the following specific examples.

*Example 1*

A concentrate analysing by weight 30.2% iron, 7.1% nickel, 0.86% copper, 0.23% cobalt, 23.7% sulphur, 19.6% silica, 5.0% alumina, 5.0% magnesia and 2.0% calcium oxide was subjected to an oxidizing roast to produce a calcine analysing by weight 33.9% iron, 8.3% nickel, 0.88% copper, 0.31% cobalt, 5.6% sulphur, 16.7% silica, 4.0% alumina, 6.4% magnesia and about 2.0% calcium oxide.

25 lbs. of the calcine was intimately mixed with 5 lbs. of the concentrate and 8 lbs. of quartz to provide a single feed material for smelting. The mixture contained 6.8 percent of sulphur by weight. The material was fed to the preheated electric furnace at a rate just sufficient to keep a thin layer of charge on the molten pool. The particle size of the charge material was of the order of minus 10 mesh. When the molten pool was deep enough to keep the electrodes off the bottom refractory, the electrodes were immersed in the slag resulting in the slag resistance method of heating the melt. The power was held at approximately 30 kw. on 100 volts until the feeding was finished. The charge melted rapidly and the total feeding time was 1.25 hours. The power was approximately 1 kw. hour per pound of charge.

Four pounds of matte was produced analysing 14.7% iron, 54.0% nickel, 4.9% copper, 1.05% cobalt and 23.7% sulphur by weight. Thirty-three pounds of slag were produced analysing 29.3% iron, 0.49% nickel, 0.07% copper, 0.13% cobalt, 0.25% sulphur, 39.7% silica, 3.5% alumina, 11.1% magnesia and 1.7% calcium oxide.

25 grams of the matter crushed to minus 200 mesh were digested with 500 cc. of 30% by volume sulphuric acid for 4 hours at 80° C. The resulting solution analysed in grams per liter 6.4 iron, 24.0 nickel, less than 0.02 copper and 0.42 cobalt, representing 98% of the nickel, 99% of the cobalt and 1.5% of the copper contents of the matte. It also contained 99% of the iron. The leach residue weighed 2.2 grams and analysed by weight 1.5% iron, 13.0% nickel, 56% copper and 0.07% cobalt.

*Example 2*

A concentrate analysing by weight 26.3% iron, 4.4% nickel, 4.6% copper, 0.23% cobalt, 23.4% sulphur, 16.0% silica, 3% alumina, 4.0% magnesia and 2.0% calcium oxide was subjected to an oxidizing roast to produce a calcine analysing by weight 30.2% iron, 4.9% nickel, 5.0% copper, 0.24% cobalt, 6.2% sulphur, 15.3% silica, 2.5% alumina, 3.8% magnesia and 1.5% calcium oxide.

Sixteen pounds of calcine was mixed with 1.75 pounds of concentrate, 5.5 pounds of quartz sand and 2.0 pounds of limestone to make up the furnace charge. This mixture contained 5.5 percent of sulphur by weight. The particle size of the resulting feed was of the order of minus 10 mesh. The electric furnace was preheated to smelting temperature and the furnace feed started with the electrodes on dead short. As soon as a molten pool developed, the electrodes were divided and the melt heated by slag resistance type of operation. Charging time was one hour and fifteen minutes. The feed material was charged to the furnace at a rate sufficient to keep a thin layer of charge on the molten pool. Approximately 1 kw. hour per pound of feed was consumed during the run. The melt was poured 10 minutes after feeding of the charge to the furnace had been completed.

Two pounds of matte was produced analysing by weight 11.2% iron, 31.7% nickel, 31.9% copper, 0.35% cobalt and 19.7% sulfur. Twenty pounds of slag was produced analysing 30.8% iron, 1.2% nickel, 0.79% copper, 0.14% cobalt, 37% silica, 7.6% alumina, 8.0% magnesia and 7.2% calcium oxide.

25 grams of matte crushed to minus 100 mesh were digested with 500 cc. of 30% by volume sulphuric acid for 4 hours at 90° C. The resulting solution analysed in grams per liter 5.6 iron, 23.3 nickel, 0.06 copper, representing 99.5% of the nickel and 0.5% of the copper contents of the matte. It also contained 85% of the iron. The leach residue weighed 11.5 grams and analysed 3.0% iron, 0.23% nickel and 69.8% copper by weight.

*Example 3*

A concentrate analysing by weight 26.3% iron, 5.5% nickel, 3.2% copper, 0.26% cobalt, 22.0% sulphur, 23.2% silica, 4.1% alumina, 10.0% magnesia and 1.5% calcium oxide was subjected to an oxidizing roast to produce a calcine analysing by weight 27.6% iron, 6.1% nickel, 3.4% copper, 0.30% cobalt, 8.5% sulphur, 24.2% silica, 7.4% alumina, 9.2% magnesia and 1.0% calcium oxide.

Twenty five pounds of calcine was mixed with 5 pounds of quartz sand. This mixture contained 7.1 percent sulphur. It was fed into the preheated furnace operating with the electrodes on dead short. As soon as possible after a molten pool of feed developed, the electrodes were divided and the tips of the electrodes immersed in the melt providing a slag resistance type heating. The charge was fed to the furnace at a rate sufficient to keep a thin layer of charge on the melt. The total feeding time was one hour and fifteen minutes and the power used was approximately 1 kw. hour per pound of charge. The melt was poured five minutes after finish of the feed.

Five pounds of matte was produced analysing 23.8% iron, 28.4% nickel, 17.9% copper, 0.83% cobalt and 23.9% sulphur. Twenty eight pounds of slag was produced analysing 30.0% iron, 0.87% nickel, 0.07% copper, 0.17% cobalt, 40.0% silica, 4.5% alumina, 2.4% calcium oxide and 9.7% magnesia.

Twenty five grams of matte crushed to minus 100 mesh were digested with 500 cc. 30% by volume sulphuric acid for four hours at 90° C. The resultant solution analysed in grams per liter 11.2 iron, 12.4 nickel, less than 0.02 copper, representing 97.0% of the iron, more than 99.5% of the nickel and less than 0.5% of the copper contents of the matte. The leach residue weighed 6.7 grams and analysed 3% iron, 0.13% nickel and 66.6% copper by weight.

Example 4

A concentrate analysing by weight 23.5% iron, 2.8% nickel, 5.2% copper, 0.14% cobalt, 16.0% sulphur, 23.2% silica, 15.0% magnesia, 1.8% alumina and 0.1% calcium oxide was subjected to an oxidizing roast to produce a calcine analysing 25.4% iron, 2.9% nickel, 5.4% copper, 0.15% cobalt, 4.1% sulphur, 24.3% silica, 15.9% magnesia, 5.7% alumina and 0.1% calcium oxide.

Fifteen pounds of calcine was mixed with 3 pounds of raw concentrate, 4 pounds of silica and 1.5 pounds of alumina to make up the electric furnace charge. This mixture contained 5.3 percent of sulphur. The particle size of the charge was of the order of minus 10 mesh. The electric furnace was preheated to the melting temperature of the charge and the furnace feed started with the electrodes on dead short. As soon as a molten pool developed, the electrodes were divided and the melt heated by slag resistance type of operation. Charging time was 45 minutes. The feed material was charged to the furnace at a rate sufficient to keep a thin layer of charge on the molten pool. Approximately 0.8 kw. hour per pound of feed was consumed during the test. The melt was poured into a cast iron slag pot 3 minutes after the charge was completely melted.

Two and one half pounds of matte was produced analysing 14.6% iron, 20.6% nickel, 36.3% copper, 0.37% cobalt and 21.6% sulphur. Twenty two pounds of slag was produced analysing 25.4% iron, 0.93% nickel, 0.95% copper, 0.14% cobalt, 0.22% sulphur, 39.7% silica, 13.3% magnesia, 22.4% alumina and 0.2% calcium oxide.

Twenty five grams of matte crushed to minus 100 mesh were digested with 500 cc. of 30% by volume of aqueous sulphuric acid for two hours at 90° C. The resultant solution analysed in grams per liter 6.0 iron, 9.1 nickel, 0.03 copper, representing 87.2% of the iron, 94.6% of the nickel and 0.2% of the copper contents of the matte. The residue weighed 14.3 grams and analysed 3.2% iron, 1.9% nickel and 67.2% copper by weight.

Example 5

1000 grams of the residue from leaching a matte with aqueous sulphuric acid analysing 4.3% iron, 0.02% cobalt, 2.9% nickel, 60.7% copper, 0.18 ounce gold per ton, 7.72 ounces silver per ton, 0.60 ounce platinum per ton, 0.60 ounce palladium and 0.33 ounce rhodium per ton was subjected to an oxidizing roast at 700° C. with intermittent hand rabbling. The resultant calcine was leached with a 10% aqueous sulphuric acid solution. A small amount of sponge copper was added to precipitate any silver that was in solution.

The solution analysed in grams per liter 1.7 iron, 3.7 nickel and 59.6 copper. It contained 42% of the iron, 73% of the nickel and 98% of the copper in the material leached. The residue analysed 20.5% iron, 11.4% nickel and 10.9% copper and contained substantially all the precious metals.

We claim:

In a method for separating metal values from a nickel sulphide ore concentrate containing sulphides of nickel, cobalt, copper, iron and precious metals together with gangue materials wherein the concentrate is smelted to form a matte and the matte is subjected to the action of aqueous sulphuric acid to obtain an aqueous sulphate solution containing nickel, cobalt and iron and a residue containing substantially all the copper and precious metal contents of the matte, the improvement wherein the matte is formed by the steps comprising subjecting said concentrate to an oxidizing roast at a temperature between about 500° C. and 800° C. to form a calcine having a sulphur content substantially lower than that of said concentrate, smelting a sulphide material in an electric furnace heated by electric energy supplied through electrodes to form a matte and a slag, and separating the matte, said sulphide material being selected from the group consisting of said calcine and a mixture of said calcine and said concentrate and containing an amount of sulphur at least equal to but not substantially greater than the amount theoretically required to form sulphides with the nickel, cobalt, copper and precious metal contents of said sulphide material.

References Cited in the file of this patent

UNITED STATES PATENTS

| | | |
|---|---|---|
| Re. 21,335 | Van Es | Jan. 23, 1940 |
| 841,721 | Ryan | Jan. 22, 1907 |
| 1,266,775 | Dhavernas | May 21, 1918 |
| 1,729,423 | Harshaw | Sept. 24, 1929 |
| 1,756,092 | Lathe | Apr. 29, 1930 |
| 2,223,239 | Hamprecht et al. | Nov. 26, 1940 |
| 2,239,626 | Schlecht | Apr. 22, 1941 |
| 2,424,866 | Udy | July 29, 1947 |
| 2,609,272 | Udy | Sept. 2, 1952 |
| 2,746,859 | McGauley et al. | May 22, 1956 |